United States Patent [19]

Lupton et al.

[11] 4,075,048
[45] Feb. 21, 1978

[54] METHOD FOR PRODUCING A BEAD FOR A PNEUMATIC TIRE

[75] Inventors: Daniel C. Lupton; Donn R. Vermilion; James L. Bucher, all of Newark, Ohio

[73] Assignee: Owens-Corning Fiberglas Corporation, Toledo, Ohio

[21] Appl. No.: 627,802

[22] Filed: Oct. 31, 1975

[51] Int. Cl.² .......................................... B29H 17/32
[52] U.S. Cl. ............................... 156/136; 152/362 R; 156/422
[58] Field of Search ............... 156/131, 135, 136, 166, 156/168, 173, 175, 180, 422, 433, 441, 137–141, 187, 392, 393; 152/362 R

[56] References Cited

U.S. PATENT DOCUMENTS

| 1,187,339 | 6/1916 | Kuentzel | 156/422 |
| 1,412,310 | 4/1922 | Lambert | 156/137 |
| 1,981,893 | 11/1934 | Abbott | 156/136 |
| 2,031,720 | 2/1936 | Lee et al. | 156/136 |
| 2,614,058 | 10/1952 | Francis | 156/175 |
| 2,625,980 | 1/1953 | Castricum | 156/123 |
| 3,237,674 | 3/1966 | Budd et al. | 156/136 |
| 3,473,595 | 10/1969 | Marzocchi et al. | 152/311 |
| 3,612,139 | 10/1971 | Brown | 152/362 |
| 3,717,448 | 2/1973 | Smith | 65/3 C |
| 3,773,394 | 11/1973 | Grawey | 156/137 |
| 3,787,224 | 1/1974 | Uffner | 428/268 |

Primary Examiner—Charles E. Van Horn
Assistant Examiner—John E. Kittle
Attorney, Agent, or Firm—John W. Overman; Ronald C. Hudgens; Greg Dziegielewski

[57] ABSTRACT

Method and apparatus for producing a bead for a pneumatic tire comprising applying a coating to a bundle of glass filaments partially drying but not curing the coated bundle, winding the bundle to form a bead and curing the bead member such as the bead will essentially retain the same geometric cross-sectional characteristics during incorporation into the tire as it had before being incorporated into the tire.

6 Claims, 7 Drawing Figures

METHOD FOR PRODUCING A BEAD FOR A PNEUMATIC TIRE

BACKGROUND OF THE INVENTIION

The bead portion of the tire is a particularly critical component by reason of its role as the primary connector, as it were, between the wheel of the vehicle and the ground-contacting tread. The bead is in direct abutting contact with the rim and, in a tubeless tire, is responsible for maintaining the air within the toroidal shell. Centrifugal force tending to throw the tire off the wheel is overcome by the bead. Additionally, of course, and perhaps more important, the forces of acceleration, with respect to the rear wheels, are transmitted to the tire via the abutting contact between the driven wheel rim and the bead. Similarly, in the case of braking or deceleration, the rapid decrease in angular velocity of the wheel is translated to the roller via the tread and the abutting contact between the bead and the rim.

Compounding the problem are the lateral forces to which the bead region is exposed as the vehicle bearing the tire is moved from side-to-side in cornering, frequently simultaneously with acceleration or conversely, deceleration or braking.

Traditionally, bead members have been formed of metal wire which is combined with rubber in an extruding operation, followed by a forming of the bead ring with an appropriate number of winds of the metal wire and a wrapping of the assembly with a friction-coated textile wrap, otherwise known as bead stock.

Recently, glass fibers have been suggested and employed in the manufacture of bead members. For example, U.S. Pat. No. 3,612,139 Marzocchi et al.; U.S. Pat. No. 3,473,595 Marzocchi et al; and U.S. Pat. No. 3,237,674 Budd et al. teach using fiberlgass as a tire bead reinforcement. As these references point out that glass cannot be simply substituted for another reinforcing material. The different properties and characteristics of the glass must be considered in the design. Furthermore, the geometry of the placement of the glass within the bead must be considered. It is believed that hoop stiffness is an important characteristic relating to the quality of bead performance in the tire. Hoop stiffness is the ability of the bead to resist deformation from its circular shape. A lack of sufficient hoop stiffness of the bead is believed to have contributed to the pecularities of early glass beads.

It is well known that the geometrical shape of a body, among other things, determines the ability of a body to resist deformation when subject to external forces. It is conventional practice to fabricate a tire using a bead member in a completely green or uncured state. Generally, a tire is a barrel shaped structure when initially fabricated, and is later transformed into its toroidal shape having a "C" shaped cross section. Furthermore, all of the components of the tire are cured at one time as the final step in fabrication. As a result of such deformation and curing, the carcass plys of the tire exert forces upon the bead structure sufficient to deform the bead structure from its original cross-sectional shape. This means that there is relatively little control over the final shape the bead structure will take under such a process. The present invention allows more control over the final cross-sectional shape taken by the bead member in the completed tire. Thereby, controlling or affecting the stiffness of the bead member by means of the geometry or shape of the bead member.

SUMMARY OF THE INVENTION

It is an object of the present invention to provide a method of producing a bead ring featuring improved bead integrity and stiffness.

It is a general object of the present invention to provide a bead ring which features glass in one form or another as a bead ring member wherein the glass elements are in a particular orientation and disposition as to lend structural integrity in the bead region sufficient to make the forces and stresses generated under a dynamic application.

It is another object of the present invention to provide a bead which essentially retains its initial geometric shape in the finished tire as when it had when initially formed.

The foregoing, as well as other objects of the present invention, will become apparent to those skilled in the art from the following detailed description:

DESCRIPTION OF THE PREFERRED EMBODIMENTS

Figure 1:
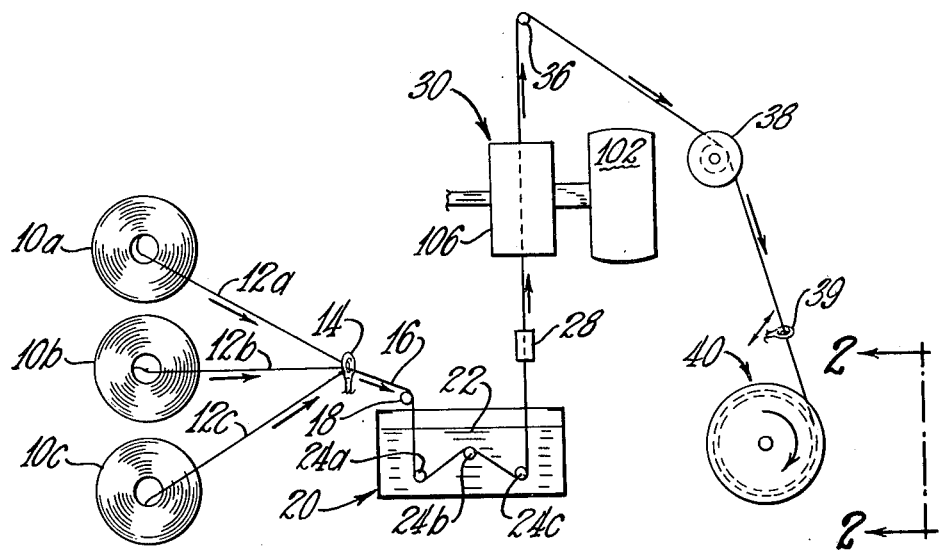
FIG. 1 is a somewhat schematic frontal elevation of apparatus for producing a bead member according to the principles of this invention.

Generally speaking, a strand is a bundle or plurality of individual fibers or filaments as gathered together following attenuation of the filaments from the platinum forming bushing. The number of filaments in a strand may vary from several hundred to several thousand. As the filaments are drawn together, they are sprayed conveniently with a size composition preferably containing an anchoring agent adapted to impart to the glass surface, the ability to adhere to the ultimate rubber stock. The size also acts as a protective coating for the filaments. Any suitable size may be used such as described in Lin, U.S. Pat. No. 3,816,235. These filaments then are collected into a bundle and are then wound upon a spool. Such strands or bundles can be combined with or without twist. FIG. 1 shows three such spools with untwisted strands 12 a, b and c respectively being fed through guide eye 14 and emerging as single untwisted strand 16. The strand 16 then passes over guide 18 and into the coating applicator 20. Therein a suitable impregnant or elastomeric coating 22 as described in Uffner, U.S. Pat. No. 3,787,224 is applied to the strand to assist in the attachent or securement of the strand to the surrounding elastomeric matrix in the tire.

After the strand 16 leaves the impregnant bath it passes through wiping die 28 to work the impregnating liquid into the innermost regions of the strand and to remove excess impregnant from the strand. Then the strand passes through a high frequency electric energy field. Here a microwave unit 30 is employed. However, it is believed a thermal oven may also be used.

In the microwave unit the strand 16 is dried to a moisture level of 0.23 to 0.27 percent by weight. It is important to note that the strand is only dried at this point and not cured. Drying is the process whereby the water is driven off from the impregnated strand. The curing process, otherwise known as vulcanization, is a process which converts the essentially plastic elastomeric misture to an essentially elastic state. Moisture levels other than the 0.23 to 0.27 percent may be employed. But moisture levels in excess of 1% have been found to produce an inferior bead.

After the strand 16 leaves the microwave unit 30, it passes over guide 36 and then to tensioning unit 38. The tensioning unit 38 operates to impart the proper amount of tension in strand 16 as it is being wound upon mandrel 40. Generally, only a nominal amount of tension is required. The amount of tension should be sufficient to effect a smooth, nonundulating, contiguous composite of wraps or windings of strand in groove 45. Since the coating of the strand 16 has only been dried and not cured, the coating is still in a plastic state.

Transversing guide 39 may operate to move or direct strand 16 back and forth in a direction parallel to the axis about which mandrel 40 rotates, if needed. This motion distributes the strand 16 over the width of groove 45 as desired.

As shown in FIG. 1, immediately after strand 16 is partially dried, it is wound around mandrel 40 into a hoop like member or torus. By such a continuous process, the moisture content of the strand 16 may be more adequately controlled. Otherwise the strand might have to be stored under controlled conditions to maintain the desired moisture level.

The mandrel 40 may be heated or unheated. But it has been found that a heated mandrel will reduce the overall cycle time required to complete a bead member. However, the mandrel 40 is only heated sufficiently to initiate the curing of the impregnant coating, but insufficiently to prevent the wraps from bonding with each other to form a unitary member. In this case the mandrel 40 was preheated to 250° F in an oven before winding the strand 16 on it.

Figure 2:
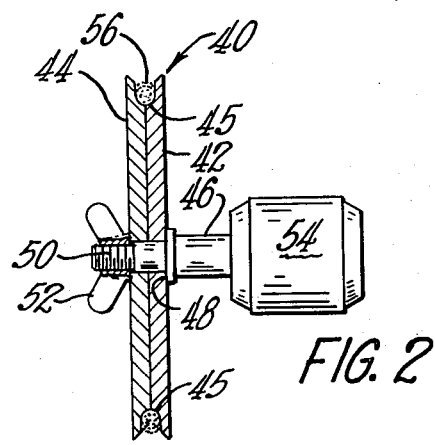
FIG. 2 is a sectional view taken along the section 2—2 of the winding station shown at FIG. 1.
Figure 3:
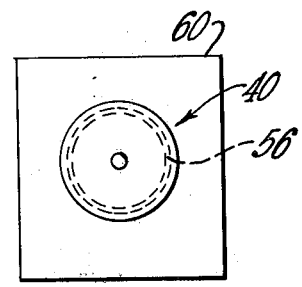
FIG. 3 is a elevation view of an oven containing the mandrel and the bead member.

As seen in FIG. 2 mandrel 40 consists of two mated mandrel halves 42 and 44 made of any suitable material such as aluminum. The mandrel is located on shaft 46 which is driven by motor 54. The mandrel 40 is located on shaft 46 by shoulder 48 on one side. And is retained on shaft 46 by wing nut 52 which engages the threaded section 50 of shaft 46 so that mandrel 40 is rigidly fastened thereon. Mandrel 40 is also angularly connected to shaft 48 by means of a key and key way (not shown). The strand 16 may be wound as many times as desired around mandrel 40. Howeer, it has been found that 80 wraps of a strand containing 6,156 "G" size filaments produce a suitable bead structure for an average passenger car tire. A "G" size filament, has a diameter of approximately 0.00036 inch.

Once the desired number of wraps have been wound, the mandrel 40 containing the newly formed bead member 56 is then placed in oven 60. Oven 60 may be of any suitable type; here a conventional thermal oven is used. Therein, the bead is cured for 20 minutes at 250° F. However, this produces only a partial cure of bead 56. That is, additional energy is added sufficient to effect a partial cure of the coating of the bead member such that the bead member will retain essentially the same geometric cross-sectional shape or characteristics during the incorporation into the tire as it had when initially formed on the mandrel or prior to incorporation into the tire, but insufficient to prevent the coating from bonding with the carcass when the tire is finally cured. The bead member will not be suitable if the bead is heated to the extent that the coating becomes charred. Heating the bead member till charred will tend to prevent the bead from bonding with the carcass of the tire.

At this stage the wraps of coated strand lose, or have a tendency to lose, their individual identity and merge into an integral bead member of generally parallel, immediately adjacent individual glass filaments, having a homogeneous coating or impregnant throughout the bead. That is, the resulting structure appears to be a single, integral hoop or bead consisting of a plurality of closely packed individual glass filaments interspersed in an elastomeric matrix. Since the bead member is partially cured, it exhibits a greater degree of stiffness and integrity than if it were uncured. This results in an additional benefit in that the bead member 56 will be easier to handle or control during the tire fabricating process.

Of course, a bead that is fully cured, prior to incorporation into the tire, will effect the same desirable results as a partially cured bead according to the principles of the invention. However, more energy than absolutely necessary will be expended in fully curing the bead as opposed to only partially curing such a bead. Furthermore, it is believed that a partially cured bead may produce a better bond with the carcas than a completely cured bead. Therefore, the partially cured bead is preferred.

Figure 4:
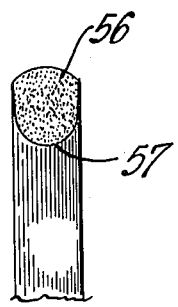
FIG. 4 is a partial sectional view of the bead member as finally formed on the mandrel.

FIG. 4 is a cross-section of bead 56 after it has been removed from mandrel 40. Since bead 56 tends to retain its initial shape in the completed tire, it is necessary that the inner surface 57 of the bead 56 be rounded. That is, there must be no sharp corners at the region where the carcass plies 87 and 88 tend to exert forces on the cross sectional shape of the bead. With conventional tire construction, this would be along the inner half of the bead surace or inner surface 57.

Figure 5:
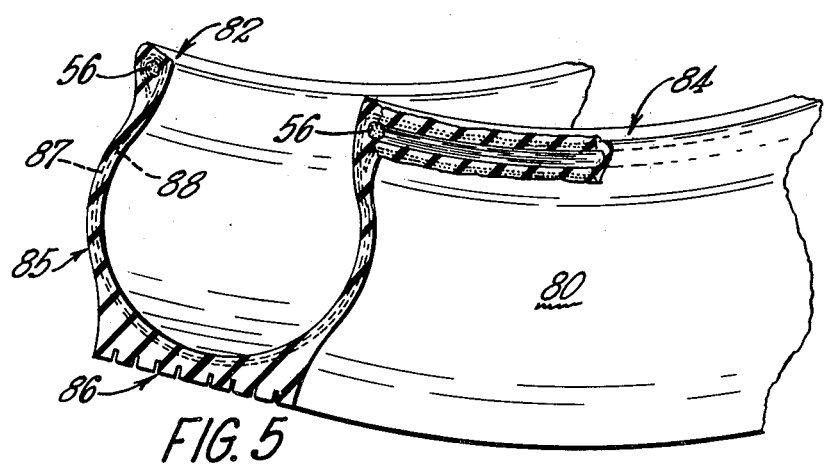
FIG. 5 is a perspective view of a section of a tire embodying a bead construction according to the present invention.

Referring to FIG. 5 it can be seen that the inner surface 57 is semicircular, although it has been found that a rectangular shape with the inner corners of approximately ⅛ inch radius are adequate. It is well known in the art that during final cure carcass plies 87 and 88 which are wrapped around bead 56 exert extreme pressure upon the bead, which tend to deform it. Since in this case the bead retains its original shape, the carcass plies must conform to the shape of the bead. If the bead were to have a sharp angular shape at the inner surface, the carcass plies would be forced to conform to the small radius bend. This would produce a tendency to damage the carcass plies and/or the bead itself. If the bead deformed, it would exhibit a tendency to loose its integrity at those corners.

A bead, according to the principles of this invention, may be used with any of the types of tire construction. For example, bias, bias belted, or radial construction may be used with this type bead. In any case the tire generally consists of two bead sections such as 82 and 84, of carcass 81, and a tread section 86 at the crown along the periphery of the tire. As with conventional beads, the bead member 56 may be covered with bead stock, before being incorporated in the tire. And the carcass and tread consists of any suitable elastomeric stock, as known in the art.

Aside from the requirement that the inner surface 57 be of a rounded configuration the bead may be of any desired cross-sectional shape. It is well known that for a given material the cross-sectional shape will determine its relative strength or stiffness. A bead produced according to the principles of this invention results in a more predictable bead configuration in the completed tire. Therefore, its strength characteristics are more predictable. Where as, a conventional bead using glass or steel in a conventional elastomeric matrix, which is uncured when the tire is being constructed, will deform according to the particular characteristic pressures exerted by the carcass plies.

Generally, a bead can be described as having the shaped of a torus or hoop. According to the principles of this invention the bead structure formed from untwisted bundles of filaments could be described as an endless cord consisting a plurality of closely spaced, generaly parallel individual filaments. The impregnant used in this strand will be generally evenly interspersed between the individual filaments and over the surface of the bead structure formed. After the bead has been sufficiently cured, the bead has a tendency to become an integral, unitary structure having generally a greater stiffness than a bead which is not cured.

Figure 6:
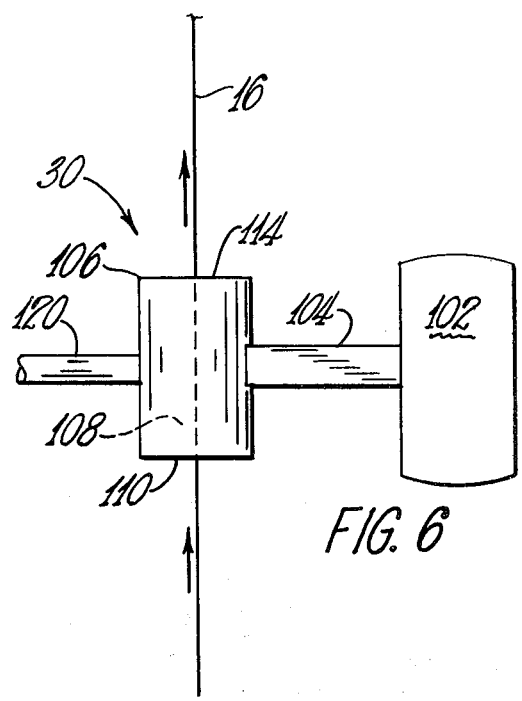
FIG. 6 is an enlarged view of the microwave unit shown in FIG. 1.
Figure 7:
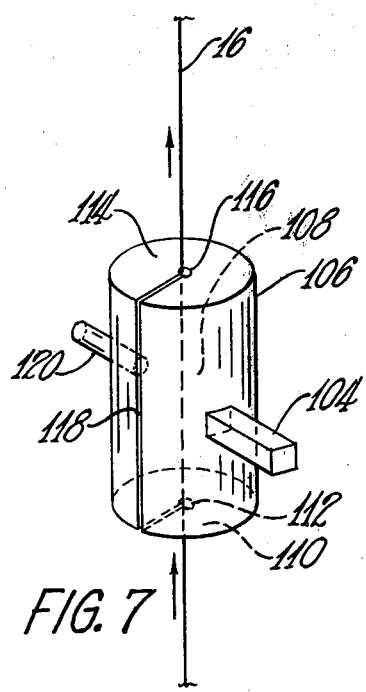
FIG. 7 is a perspective view of the resonant cavity of the microwave unit.

As shown in FIGS. 1, 6 and 7, the wet impregnated strand 16 after leaving the wiping die 28, advances to a strand drying unit that may be a high frequency drying means such as a microwave unit 30. The resonant cavity 108 receives its microwave energy from a microwave generator, such as magnetron 102, through a wave guide 104.

FIGS. 6 and 7 show enlarged views of the microwave unit 30. As shown, the unit 30 has a tubular housing 106 that is made of electrically conductive material and that is closed at both ends to provide a cylindrical resonant cavity 108 excited by the magnetron 102 through the wave guide 104. The tubular housing has a closed entrance end 110 with a strand entrance opening 112 of sufficient size to admit the wet strand 16, into the resonant cavity 108.

Similarly there is a closed exit end 114 at the opposite side of the tubular housing 106 having a strand exit opening 116. The tubular housing 106 also has a strand lacing slot 118 communicating with the strand entrance opening 112 and strand exit opening 116 and resonant cavity 108. The width of the lacing slot is sufficient to allow a operator to swiftly position the strand into the entrance opening and the exit opening by means of the lacing slot. This strand is aligned so that it does not physically touch any portion of the microwave unit as it passes therethrough.

While it is possible to use microwave drying units operating at higher modes, the microwave arrangement normally operates the cylindrical resonant cavity 108 as its fundamental mode to couple microwave energy into the fluid in the strand 16. More specifically, the apparatus operates in the $TM_{010}$ mode where the electric field components or lines extend in a direction parallel to the longitudinal axis of the resonant cavity, and where the electric field increases from substantially zero along the internal wall surface of the tubular housing 106 to a maximum along the longitudinal axis of the cavity 108. The increase in electrical field intensity is a curved line function providing a substantially higher electric field intensity in the central region of the cavity 108 than the outer region of the cavity. The transverse electrical field intensity profile is uniform throughout the length of the cavity 108. According to the field orientation in the $TM_{010}$ mode and the cylindrical resonant cavity the magnetic field orientates itself transverse of the cavity 108.

Magnetic field components or lines extend circumferentially about the cavity's longitudinal axis. The magnetic field lines, in any one transverse plane, are arranged in concentric circles that are centered on a longitudinal axis of cavity 108. The intensity of the magnetic field increases from substantially zero at the longitudinal axis of cavity 108 to a maximum at the interior wall surface of tubular housing 106.

One can vary the power at which the microwave unit 30 is operated and the speed at which strand 16 is fed through the unit 30 according to the type of impregnate 22 that is used. The physical dimensions of the tubular housing 106 also vary with the frequency range applied, type of coating used, and the speed of the strand 16. However it has been found useful to operate the microwave heating unit 30 generally in a range from 500 to 5000 megacycles to remove the liquid from the traveling strand depending upon the line speed and other factors. In this case line speeds were between 100 and 600 ft./min.

A suitable arrangement supplies air to the resonant cavity 108. A source of air under appropriate pressure connects at one end to tube 120, the other end of the tube 120 communicates with the resonant cavity 108. The air purges the resonant cavity 108 to insure that the cavity does not become saturated with moisture; more over, because power dissipated in unit 30 generates heat in the walls of the tubular housing 106 the moving air cools the interior surfaces of the tubular housing 106. It may be useful at times to supply air to the resonant cavity 108 through the wave guide 104 together with the microwave energy.

It may also be advantageous to supply heated air to the resonant cavity 108, similar to that described in Smith, U.S. Pat. No. 3,717,448. Air purging the resonant cavity 108 controls the relative humidity in such cavity, and hence controls the rate at which the air in the cavity 108 is able to absorb the vapor given off by the advancing strand 16 during drying. The velocity of air moving into the cavity 108 should be low enough to keep the strand essentially undisturbed and vibration free.

While the embodiments of the invention shown here use a microwave arrangement for drying the strand 16, one can use other means of drying. For example, one may use other high frequency heating means such as arrangements employing infrared and dielectric energies. It is also possible to use other heating means including thermal ovens even where such ovens employ an open flame. However, electro magnetic wave energy in a microwave range is usually preferred.

Furthermore, it is possible to process twisted strands of glass filaments as well as filaments other than glass according to the principles of this invention. It will be appreciated that variations and constructional features, as well as substitution of equivalent components, may be undertaken without departing from the spirit and scope of the present invention.

We claim:

1. The method of producing a bead member for a pneumatic tire having a carcass comprising:
  applying an elastomeric material to a bundle of filaments to form a coated bundle;
  drying the elastomeric material;

winding the coated bundle upon a heated mandrel to form a toroidally shaped bead member, the mandrel being heated sufficient to initiate curing of the elastomeric material; and before incorporating the bead member in the tire, heating the bead member to further cure the elastomeric material so that the bead member retains the same geometric characteristics during incorporation into the tire as the bead member possessed before incorporation into the tire.

2. The method of claim 1 wherein the coated bundle is dried by in the absence of curing the coated bundle.

3. The method of claim 2 wherein the coated bundle is dried by a high frequency electrical field in a confined space.

4. The method of claim 3 wherein the strand is dried such that the strand contains of 0.1 to 0.4 percent water by weight.

5. The method of claim 4 wherein the strand is dried such that the strand contains of 0.23 to 0.27 percent water by weight.

6. The method of claim 1 wherein the filaments are glass filaments.

* * * * *